United States Patent Office 2,942,392
Patented June 28, 1960

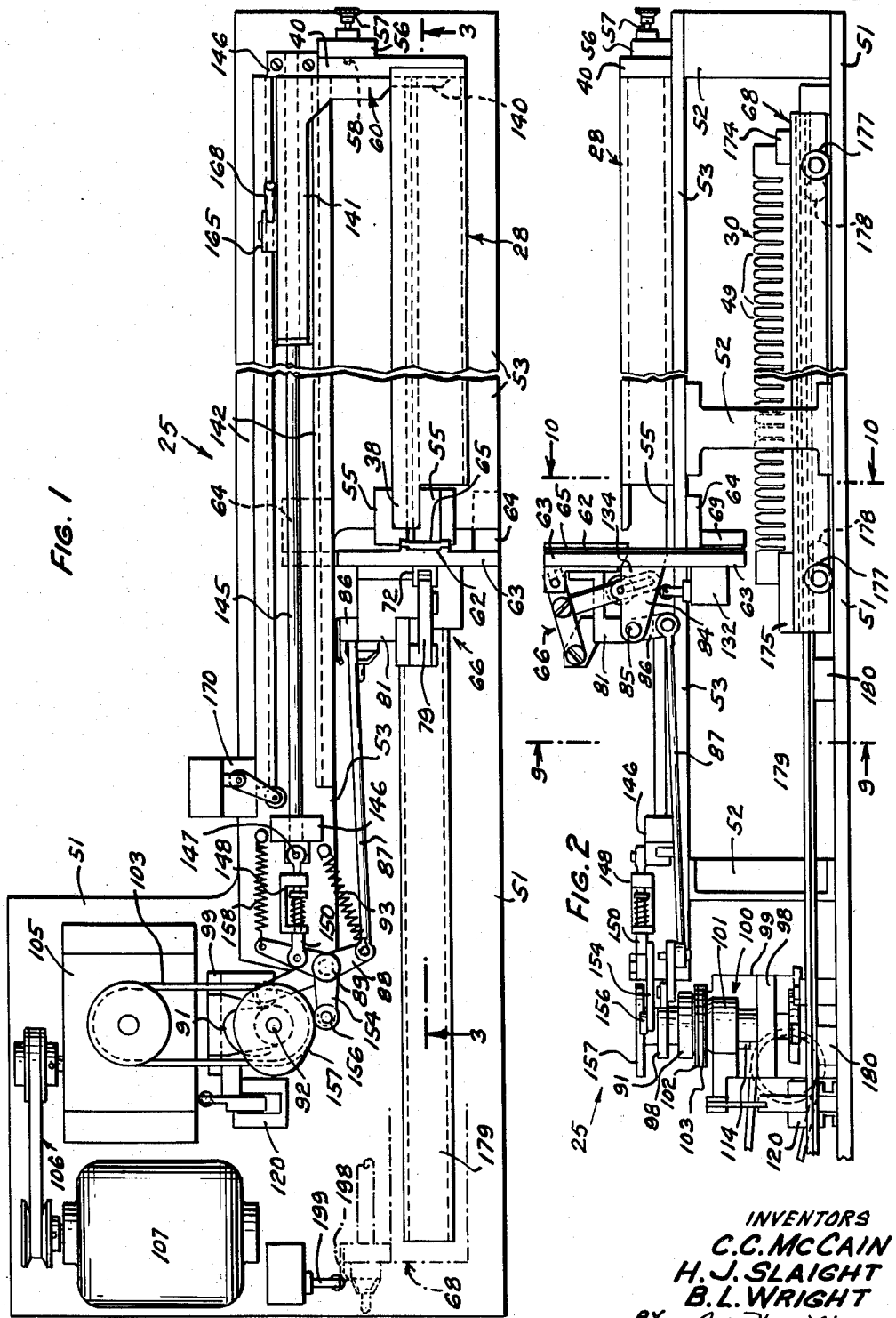

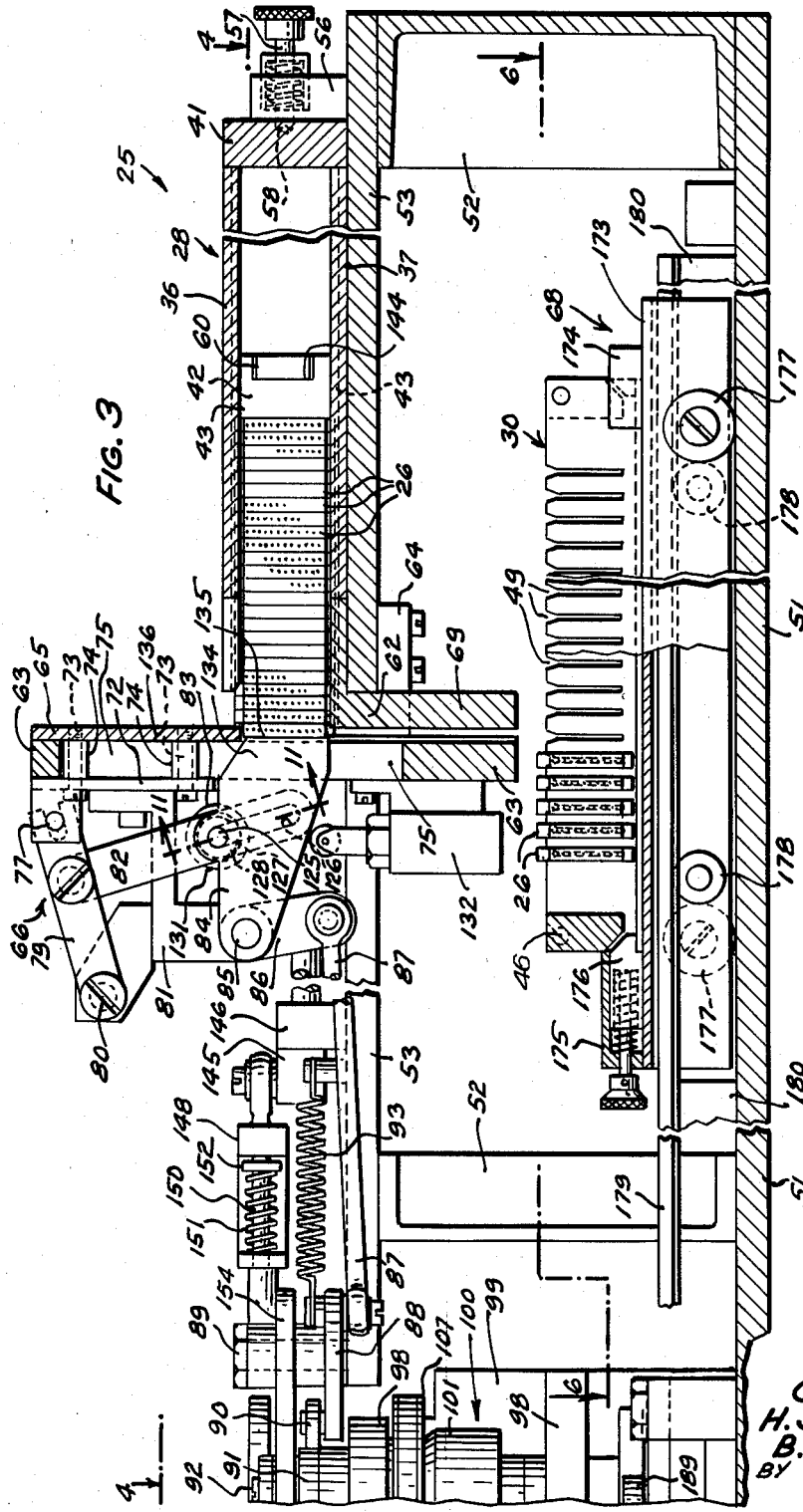

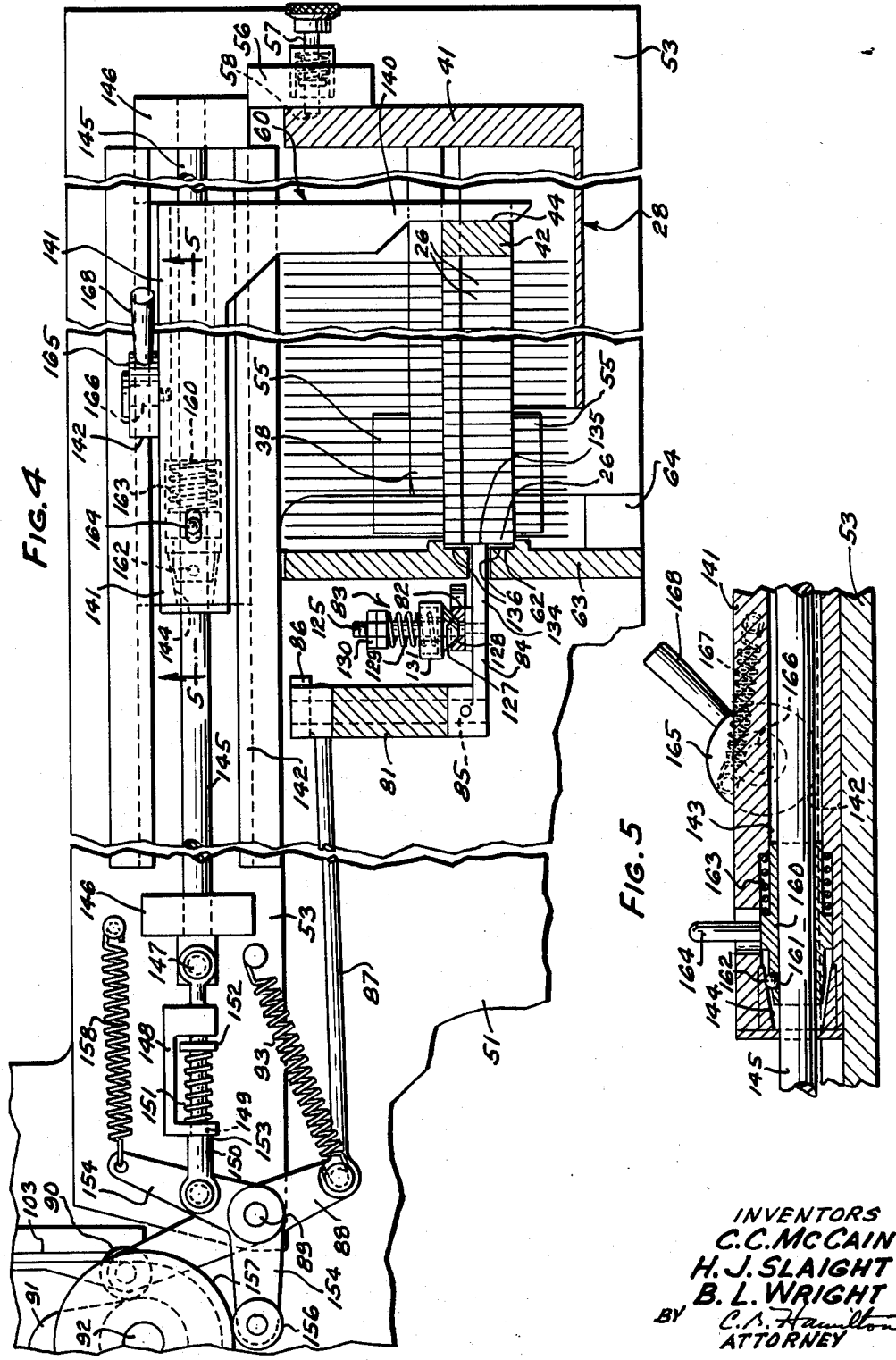

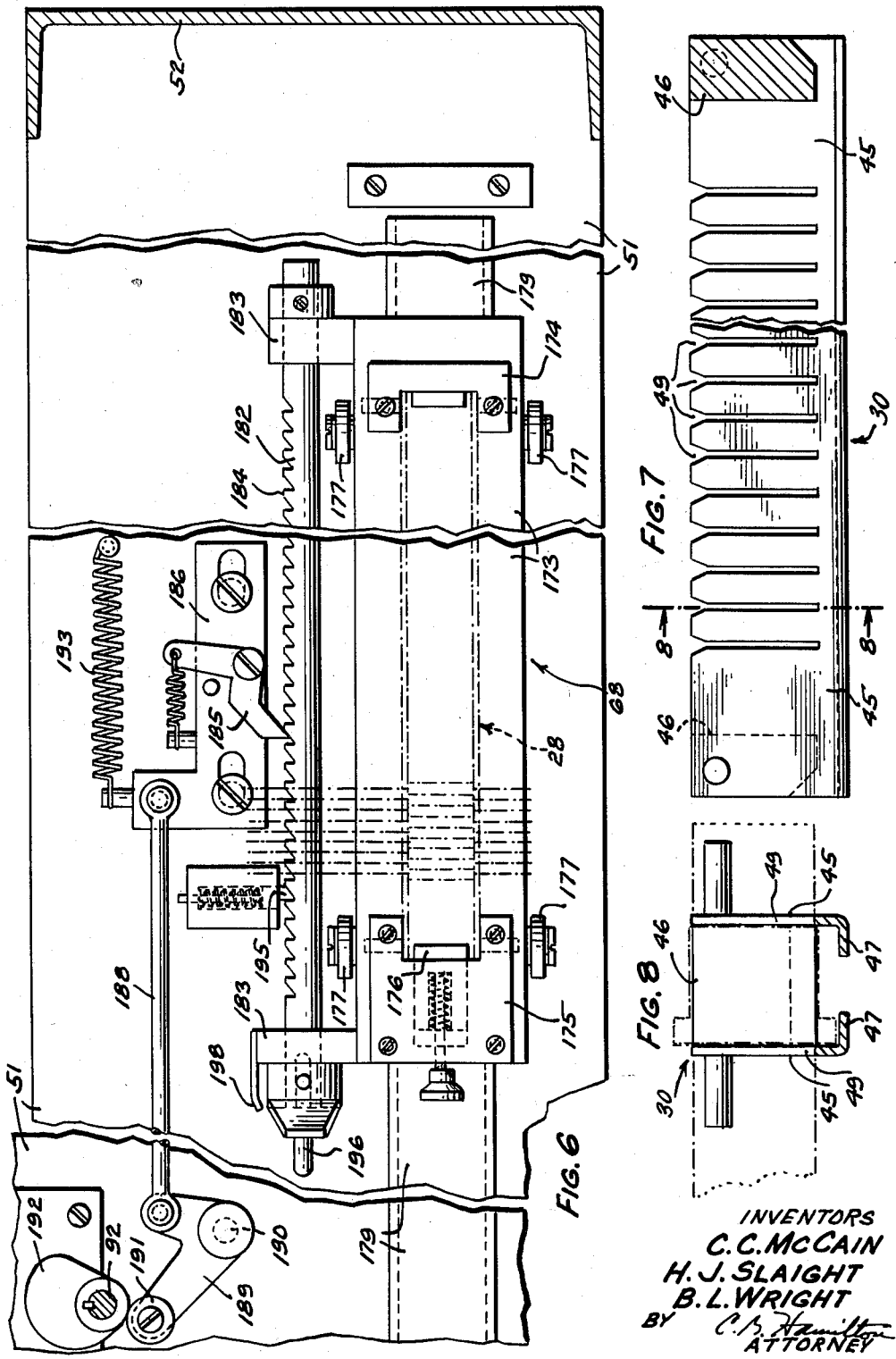

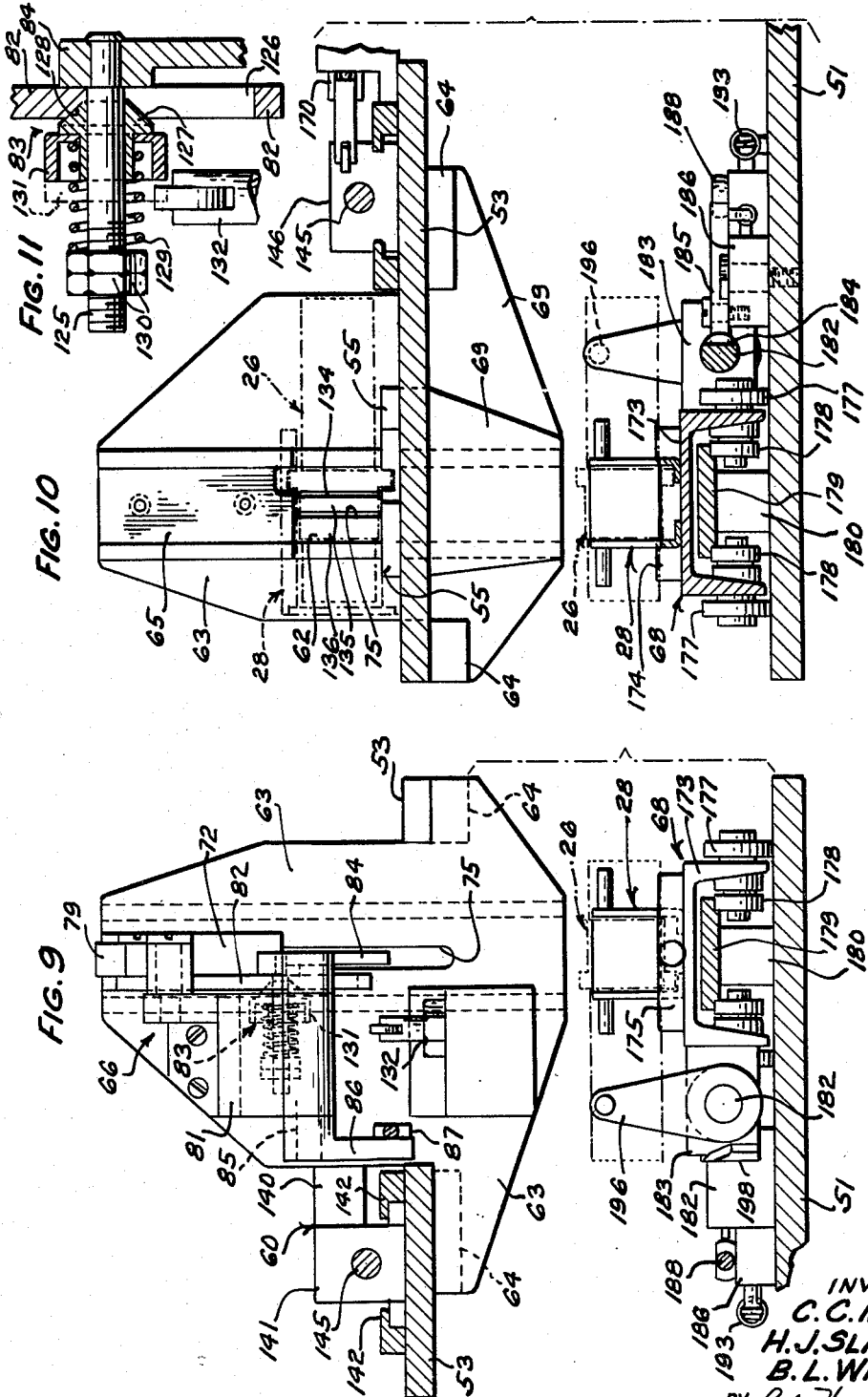

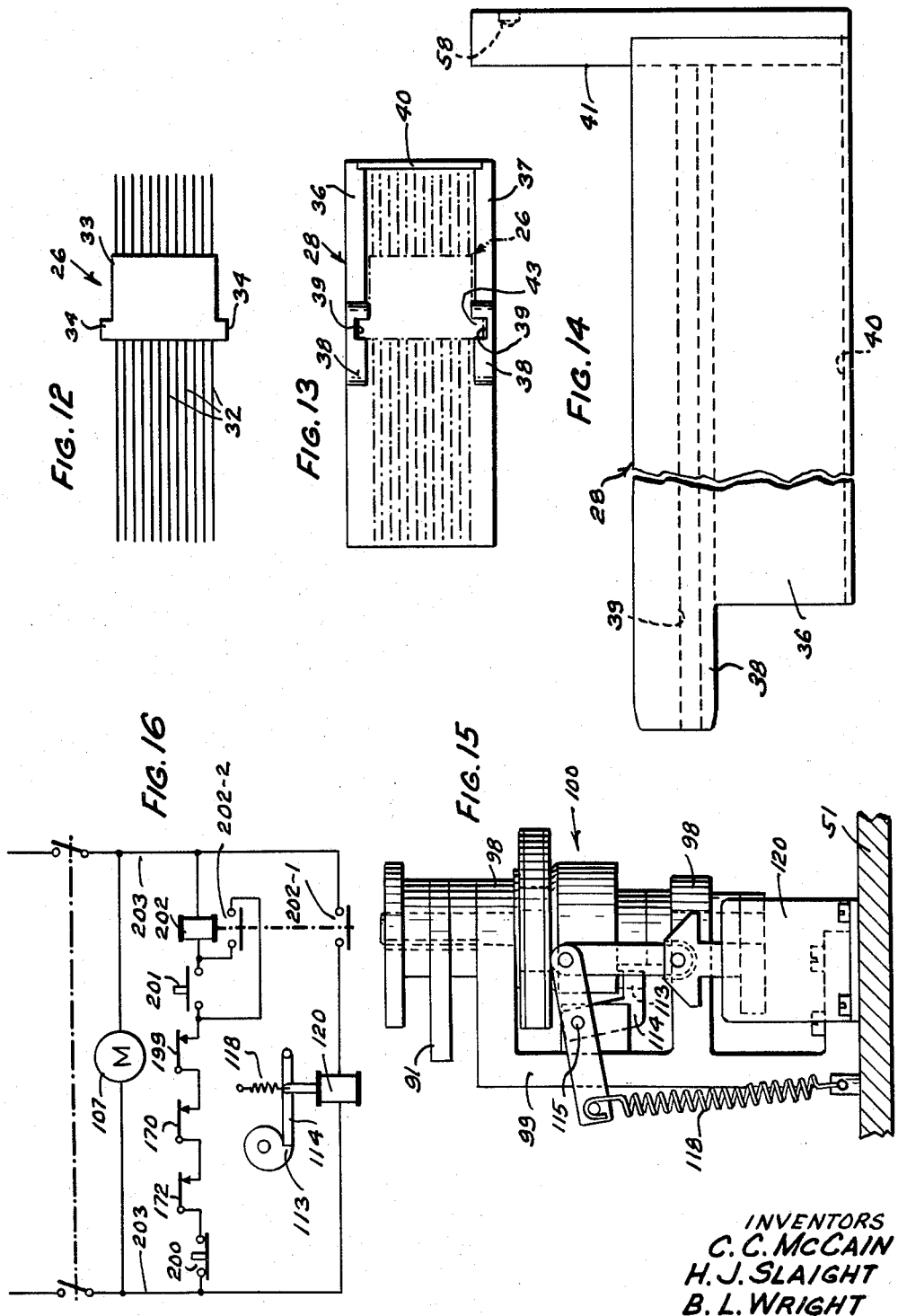

2,942,392

APPARATUS FOR TRANSFERRING ARTICLES IN ABUTTING RELATION TO EACH OTHER FROM ONE MAGAZINE INTO ANOTHER MAGAZINE IN SPACED RELATIONSHIP

Cecil C. McCain, Glen Ellyn, Harold J. Slaight, Lyons, and Ben L. Wright, Chicago, Ill., assignors to Western Electric Company, Incorporated, New York, N.Y., a corporation of New York Filed Apr. 9, 1958, Ser. No. 727,417

3 Claims. (Cl. 53—246)

This invention relates to article-transferring apparatus and more particularly to an apparatus for removing from one magazine articles stacked therein in contact with each other and placing the articles in another magazine in spaced relation to each other to facilitate subsequent processing of the articles.

An object of the present invention is to provide an apparatus for transferring articles in abutting relation to each other from one magazine into another magazine in spaced relation to each other.

Another object of the invention is the provision of apparatus for removing from one magazine articles stacked therein in contact with one another and for placing the articles in another magazine in laterally spaced relation to each other to facilitate subsequent handling of the articles.

With theese and other objects in view, the invention contemplates the provision of an apparatus having a frame for releasably and fixedly supporting a first open-ended magazine in a horizontal position with a row of articles stacked therein in contact with one another, and the frame having means for movably supporting below the first magazine a second magazine with transversely disposed, longitudinally spaced slots therein for receiving the articles and supporting them in spaced relation to each other. Mechanism is provided for advancing the row of stacked articles step-by-step from the first magazine into engagement with an abutment to align the first article of the row with a vertically disposed guideway, and a plunger slidable in the guideway is actuated in timed relation to the step-by-step movement of the row of articles to eject the articles individually downwardly through the guideway into the second magazine which is indexed in timed relation to the movement of the plunger to align successive transverse slots therein with the guideway for receiving the articles.

Other objects and advantages of the invention will become apparent by reference to the following detailed description thereof and the accompanying drawings, in which Fig. 1 is a plan view of the apparatus embodying the present invention;

Fig. 2 is a front elevational view of the apparatus shown in Fig. 1 with portions thereof broken away;

Fig. 3 is an enlarged fragmentary vertical sectional view of the apparatus taken on the line 3—3 of Fig. 1;

Fig. 4 is a fragmentary plan sectional view of the apparatus taken on the line 4—4 of Fig. 3;

Fig. 5 is an enlarged fragmentary vertical sectional view of the apparatus taken on the line 5—5 of Fig. 4;

Fig. 6 is a fragmentary plan sectional view of the apparatus taken on the line 6—6 of Fig. 3;

Fig. 7 is an enlarged fragmentary side elevational view of one of the magazines for holding the articles in spaced relation to each other;

Fig. 8 is a cross-sectional view of the magazine taken on line 8—8 of Fig. 7;

Figs. 9 and 10 are enlarged vertical cross-sectional views of the apparatus taken on lines 9—9 and 10—10 of Fig. 2;

Fig. 11 is a fragmentary cross-sectional view of a yieldable linkage connection taken on the line 11—11 of Fig. 3;

Fig. 12 is a view of the article;

Figs. 13 and 14 are end and plan views, respectively, of the other type of magazine for holding the articles in abutting relation therein;

Fig. 15 is a fragmentary view of the apparatus showing a portion of the drive mechanism therefor, and Fig. 16 is a wiring diagram of the electrical control for the apparatus.

The present apparatus 25 is designed to remove articles 26 (Fig. 12) from a first magazine 28 (Figs. 2, 3, 13, and 14) in which they are supported in a row in abutting relation to each other and transfer them to a second magazine 30 (Figs. 2, 3, 7 and 8) in which they are supported in spaced relation to each other. The articles 26 disclosed herein are relay components each having a row of wires 32 mounted in parallel and spaced relation to each other in a block 33 of dielectric material which is molded around portions of the wires and has a pair of laterally extending ears 34. After being formed in a molding apparatus, the articles 26 are ejected therefrom onto the first magazine 28.

The magazine 28, open along one side and one end, has a pair of opposed parallel top and bottom walls 36 and 37 for receiving the blocks therebetween, and these walls have reduced ends 38. Longitudinal grooves 39 formed in the walls 36 and 37 receive the ears 34 of the articles. Along one side of the magazine, the top and bottom walls are connected to a wall 40 and at one end to a wall 41 which extends laterally beyond the top and bottom walls. A spacer block 42 (Fig. 3) placed between the end wall 41 and the row of articles 26, has beads 43 slidable in the grooves 39 of the magazine and has a recess 44 for receiving a pusher 60 for pushing the row of articles 26 from the magazine 28.

The second magazine 30 (Figs. 7 and 8) for receiving the articles 26 after they are removed from the first magazine comprises a pair of side walls 45 mounted in spaced relation to each other by a pair of spacer blocks 46 secured to the ends thereof. Inwardly directed flanges 47 on the side walls 45 form a support for the magazine. Vertical slots 49 are formed in the side walls 45 in spaced relation to each other and to the flanges 47 for receiving the wires 32 therein to support the articles 26 in spaced relation to each other.

Referring to Figs. 1 and 2, the apparatus 25 comprises a frame including a base plate 51, a plurality of vertical-supporting member 52 thereon, and a platform 53 mounted on the members 52 in spaced and parallel relation to the base plate. The first magazine 28 is adapted to be removably supported in a fixed position on the platform 53 during the transferring of the articles therefrom, and for this purpose, the platform is provided with a pair of spaced positioning lugs 55 (Figs. 1 and 2) forming a nest for receiving the reduced end portion 38 of the bottom wall 37 of the magazine for locating the forward end of the magazine in a predetermined position on the platform. An upstanding positioning member 56 on the platform 53 is engageable with the end wall 40 of the first magazine and has a spring-pressed manually operable locking pin 57 engageable in a recess 58 in the end wall 40 for locating and locking the other end portion of the magazine in a predetermined position on the platform.

The row of articles 26 in the first magazine is adapted to be moved to the left as viewed in Figs. 1-4 by the pusher 60 in the form of an arm engageable with the spacer block 42 in the magazine to advance the leading article 26 of the row into a vertical guideway 62 formed in a vertical frame plate 63 on the platform 53. The plate 63 has a pair of horizontally disposed attaching lugs 64 secured to the underside of the platform. A plunger 65 slidable in the guideway 62 is reciprocated by an actuating mechanism 66 to move successive articles 26 downwardly through the guideway 62 into slots 49 in the second magazine 30 supported therebelow on a carriage 68. A vertically disposed plate-like member 69 formed integral with and extending downwardly from the positioning lugs 55 on the platform 53 in spaced relation to the frame plate 63 cooperates with the plate 63 to form a portion of the guideway 62 for guiding the articles during their downward transfer movement from the first to the second magazine.

The plunger 65 is slidably mounted in the guideway 62 on one side of the frame plate 63 and is connected to a slide member 72 on the opposite side of the plate 63 by a pair of screws 73 and spacer sleeves 74 which are movable in a vertical slot 75 in the plate 63. The mechanism 66 for actuating the plunger includes a connector pin 77 mounted in a pair of lugs on the slide member 72 and this pin fits in the slotted end of a lever 79, the other end of which is pivoted at 80 to a bracket 81 which is secured to the plate 63. Intermediate its ends, the lever 79 is connected to one end of a link 82 which is pivotally connected by a yieldable connection 83 to a lever 84 which in turn is secured to one end of a rock shaft 85 supported in the bracket 81. At its other end, the rock shaft 85 is connected to one end of a lever 86, the lower end of which is connected through a link 87 to a lever 88. This lever is pivotally supported intermediate its ends on a vertical pivot pin 89 on the platform 53 and the other end of the lever 88 has a cam follower 90 engaging a cam 91 which is fixed to a cam shaft 92 and cooperates with a spring 93 for actuating the lever 88 to effect the reciprocation of the plunger 65 through the linkage 87, 86, 84, 82 and 79.

The cam shaft 92 is journaled in a pair of arms 98 of a bracket 99 mounted on the base plate 51 and is driven through one-revolution clutch 100 mounted thereon. A driven element 101 of the clutch loosely mounted on the shaft has a pulley 102 keyed thereto which is connected through a belt and pulley connection 103, a gear-reducer unit 105, and a belt and pulley connection 106 to an electric motor 107 mounted on the base plate 51. The clutch is normally engaged to effect rotation of the cam shaft and has an element 113 for disengaging the clutch to stop the cam shaft in response to actuation of the element by an arm 114 pivotally mounted at 115 on the bracket 99. This arm 114 is urged by a spring 118 to an operative position in the path of movement of the clutch element 113 to effect its actuation to disconnect the motor drive and the arm 114 is moved to an inoperative position by a solenoid 120 in response to energization thereof to release the element 113 and connect the motor drive.

In the event that an article 26 becomes jammed in the passageway 62 during its transfer, the yielding connection 83 serves to release the link 82 from driving engagement with the lever 84 and thereby prevent damage to the article and the apparatus and also to actuate the clutch 100 to disconnect the motor drive. As seen in Figs. 3, 4, 9 and 11, the yieldable connection comprises a rod 125 which is fixed at one end to the lever 84 and extends through a slot 126 in the link 82 and which has an annular connector element 127 slidable thereon. The connector element has a conical end adapted to seat in a conical recess 128 formed in the link 82 at the upper end of the slot 126 and this connector element is held in the recesses 128 of the link with a predetermined pressure by a spring 129 positioned between the element 127 and a pair of adjustable nuts 130 threaded on the rod 125.

When an article 26 becomes jammed in the passageway 62 and prevents downward movement of the plunger 65 through its normal stroke, the link 82 is held against movement while the lever 84 continues its movement which results in the connector element 127 being cammed out of the conical recess 128 in the link 82 and moved axially on the pin 125 from its normal seated position to a second position indicated in dotted lines in Fig. 11. A roller 131 is rotatably mounted on the connector element for vertical oscillatable movement and for axial movement therewith from a normal first position to a second position when the yieldable connection is broken. A normally closed switch 132 is mounted on the frame plate 63 in a position where it is engaged and actuated by the roller 131 when the roller has been moved axially to its second position on the rod 125 and has been moved downwardly with the lever 84. In response to the actuation of the switch 132 to its open position by the roller 131, the solenoid 120 is deenergized to effect disengagement of the clutch and the stopping of the cam shaft 92 to enable the operator to remove the interfering article 26.

As seen in Figs. 3 and 4, the lever 84 has an extension which forms an abutment 134 movable in the slot 75 in the plate 63 and having an end face 135 extending in spaced and parallel relation to a vertical surface 136 of the guideway 62. When the lever 84 and the plunger 65 are in their upper position, the abutment 134 is disposed in the path of travel of the row of articles 26 in the magazine and the end surface 135 thereof is adapted to engage the endmost article and stop its movement in a position in spaced relation to the surface 136 of the guideway 32. The abutment 134 being interconnected with the plunger is moved out of the slot 75 from its normal upper position prior to the engagement of the plunger with the endmost article 26 to permit expansion of the row of articles and permit movement of the endmost article into engagement with the surface 136 and thereby lessen the pressure and frictional engagement between adjacent articles whereby the plunger 65 may readily disengage the endmost article from the next article and push it through the guideway 62 into the magazine 30 therebeneath.

Referring again to Figs. 1, 3–5 and 10, the pusher 60 for advancing the row of articles 26 comprises an arm 140 positioned between the end wall 41 of the first magazine 28 and the row of articles therein and in the recess 44 of the spacer block 42. This arm 140 extends laterally from an elongated slide 141 mounted on the platform 53 and guided for movement parallel to the row of articles by a pair of guides 142. The slide 141 has a longitudinal aperture 143 therethrough and a conical surface 144 at one end thereof through which a rod 145 extends. This rod is mounted for reciprocable movement in bearing blocks 146 on the platform 53 and is pivotally connected at 147 to one end of a yoke 148 which has an aperture 149 in one arm thereof in which a rod 150 is slidably mounted. A spring 151 is mounted on the rod between one arm of the yoke and a collar 152 secured to the rod and this spring urges the rod in the right-hand direction as viewed in Figs. 1 and 4 to engage a shoulder 153 on the rod with the end of the yoke. Reciprocation is imparted to the rod 159 and the rod 145 by a bell-crank lever 154 which is pivotally mounted on the stationary pivot pin 89 and is connected to the rod 150. A cam follower 156 on the bell-crank lever 154 rides on a cam 157 which is fixed to the cam shaft 92 and cooperates with a spring 158 to oscillate the bell-crank lever.

A sleeve 160 (Fig. 5) slidably mounted on the rod 145 and positioned within the aperture 143 in the slide 141 has three radially disposed apertures 161 in which are mounted three balls 162. These balls are engageable with the conical surface 144 of the slide 141 and with the rod 145 for effecting a gripping engagement between the conical surface and the rod to lock the pusher 140 to the rod 145 in response to movement of the rod to the left as viewed in Figs. 4 and 5. A spring 163 interposed between shoulders formed on the sleeve 160 and the slide 141 urges the sleeve in one direction to yieldably maintain the balls 162 in engagement with the conical surface 144, and a handle 164 secured to the sleeve and extending through a slot in the slide block 141 is provided for releasing the locking engagement when it is desired to move the pusher 60 in the opposite direction.

A locking disc 165 having an eccentric aperture is mounted on a headed pin 166 on one side of the slide 141 with the periphery of the disc in engagement with one of the stationary guides 142. A spring 167 connected to the disc 165 and the slide 141 stresses the disc for rotation into engagement with the guide 142, the arrangement being such that the disc 165 locks the pusher 60 against return movement. A handle 168 mounted on the disc 165 by means of which the disc may be oscillated to disengage it from the guideway 142 and permit the return movement of the pusher 60.

It will be seen that in response to successive rotations of the cam shaft 92 the rod 145 will be reciprocated through a predetermined stroke to index the pusher 60 and move the row of articles 26 against the abutment member 134 as successive articles are transferred to the second magazine 30. The yieldable connection formed at the end of the rod 144 and including the elements 147, 150 and the spring 151 permit slight variations in the movement of the pusher 60 in the event of variations in the spacing of the articles 26 due to the presence of foreign matter therebetween. When the pusher 60 has been indexed to the point where all of the articles 26 have been removed from the magazine 28, the end of the slide 141 trips a switch 170 (Figs. 1 and 10) mounted on the platform 53 to render the motor drive inoperative and permit the operator to remove the empty magazine 28 and replace it with a full one.

The carriage 68 which supports the second magazine 30 for movement under the guideway 62 comprises a channel-shaped frame 173 which has a positioning block 174 mounted thereon at one end for receiving one end of the magazine 30 and locking it in position. At its other end, the carriage frame 173 has a positioning block 175 with a spring-pressed manually operable locking pin 176 for positioning and locking the other end of the magazine on the carriage. Rollers 177 secured to the outside of the carriage support it for rolling movement on the base 51 and a plurality of rollers 178 mounted on the inside of the channel frame 173 engage a track 179 for guiding the carriage along a predetermined straight path under the guideway 62. The track 179 is mounted on spacer blocks 180 secured to the base 51.

Mechanism for indexing the carriage and the second magazine 30 to align successive slots with the guideway 62 at the transfer station includes a ratchet rod 182 rotatably supported in brackets 183 on the side of the carriage frame 173 and having a plurality of ratchet teeth 184 along one side thereof. The ratchet rod 182 is actuated by a feed pawl 185 mounted on a pawl holder 186 which is supported on the base plate 51 for reciprocable movement. A link 188 connects the pawl holder 186 to a bell-crank lever 189 which is pivotally mounted at 190 on the base plate and has a cam follower 191 engaging a cam 192 on the cam shaft 92. The cam 192 actuates the bell-crank lever and in cooperation with a spring 193 serves to reciprocate the pawl holder 186 and the feed pawl 185 through a predetermined stroke to index the carriage 68 and the magazine 30 to align successive slots 49 of the magazine 30 with the guideway 62. A spring-pressed pawl 195 is engageable with the teeth of the ratchet bar 182 for holding the carriage against return movement. To permit the return movement of the carriage 68, the ratchet rod 182 is rotated by means of a handle 196 secured thereto to disengage the pawls 185 and 195 from the teeth 184.

In response to the final indexing movement of the carriage to position the last slot of the magazine 28 in the transfer position in alignment with the guideway 62, a trip finger 198 (Fig. 6) on the carriage trips a switch 199 (Fig. 1) to cause the one-revolution clutch to become disengaged at the end of its operating cycle and stop the apparatus after the final article 26 has been transferred into the second magazine 30. The operator may then remove the magazine 30 with the articles 26 therein, and replace it with an empty magazine 30, and return the carriage 61 to its initial starting position.

The control switches 172, 170 and 199 are connected in series with a stop switch 200, a start switch 201 and a relay 202 across power lines 203. The solenoid 120 for actuating the one-revolution clutch is connected across the power lines 203 in series with a contact 202–1 of the relay 202 which also has a second contact 202–2 in parallel with the start switch 201 for locking in the relay when the start switch 201 is closed. In response to the actuation of the start switch, the relay 202 is energized, resulting in the closing of contacts 202–1 and 202–2, the former completing a circuit to energize the solenoid and cause the clutch 100 to connect the motor drive to the cam shaft 92 and effect the sequential operation of the plunger 65 to transfer the articles from the upper magazine 28 to the lower magazine 30, the indexing of the magazine 30, and the step-by-step movement of the pusher 60 to advance successive articles into the guideway 62 and in the path of the plunger 65.

The article-transferring operation is automatically stopped when the last article has been transferred from the upper magazine 28, to permit a full magazine to be substituted for the empty one; when the lower magazine has been fully loaded with articles, to permit the loaded magazine to be replaced with an empty one; and in the event an article becomes jammed in the guideway 62, to allow the operator to remove the article.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In an apparatus for transferring articles from a first portable magazine to a second portable magazine wherein the first magazine supports the articles in a row in abutting relation to each other for movement of the row of articles from one end of the magazine and the second magazine has transverse slots for supporting the articles in spaced relation to each other; a frame including a base plate and a platform disposed above the base plate; means on the platform for releasably supporting the first magazine in a predetermined fixed position thereon for movement of the articles therefrom along a horizontal path; a vertical guide member on said platform adjacent the first magazine and in the path of movement of said articles, said guide member having a passageway for guiding the articles into the second magazine; a carriage for supporting the second magazine; means on the base for guiding the carriage and the second magazine along a predetermined path past said guide member and the guideway therein; means for indexing the carriage to position the second magazine with successive slots in alignment with the guideway; a pusher slidably mounted on the platform for pushing said row of articles; means for intermittently moving the pusher to advance the row of articles step-by-step into engagement with the guide member to align the end article with the passageway; a plunger slidable on the vertical guide member for moving an article through the guideway into the second magazine; means for reciprocating the plunger including linkage having a connection releasable in response to the application of a predetermined stress thereto; drive means for actuating the indexing means, the plunger-reciprocating means and the pusher-moving means in timed relation to each other; and means operable in response to release of said connection for rendering said drive means inoperative.

2. In an apparatus for transferring articles from a first open ended magazine with the articles stacked therein in a row to a second magazine having transverse slots for supporting the articles in spaced relation to each other, a frame having means for releasably supporting the first magazine in a predetermined fixed position for movement of the articles from the open end thereof in a predetermined path, means on the frame for supporting the second magazine for movement in spaced and parallel relation to the first magazine, a guide member on the frame disposed adjacent the first magazine and in the path of movement of the articles therefrom, said guide member having a guideway for guiding the articles into the second magazine, a pusher for pushing the row of articles into engagement with the guide member to align the end article with the guideway, a plunger slidable on the guideway, means for actuating the plunger to move the end article through the guideway into the second magazine, an abutment member, means responsive to the movement of the plunger for moving the abutment member to and from an operative position with a portion thereof extending into the guideway for engaging the end article of said row of articles to position it in slightly spaced relation to the guide member whereby when said abutment member is moved from said operative position the row of articles may expand slightly into engagement with the guide member to reduce the frictional pressure between adjacent articles in the row, means responsive to the actuation of the plunger for indexing the second magazine to align successive slots with the guideway for receiving the articles, and means responsive to the actuation of the plunger for moving the pusher step-by-step to advance the row of articles into engagement with said abutment member and said guide member.

3. In an apparatus for transferring articles from a first portable magazine to a second portable magazine wherein the first magazine supports the articles in a row in abutting relation to each other for movement of the articles from one end of the magazine and the second magazine has transverse slots for supporting the articles in spaced relation to each other, a frame including a base and a platform disposed above the base, means on the platform for releasably supporting the first magazine in a predetermined fixed position thereon for movement of the articles therefrom along a predetermined path, a guide member on said platform positioned adjacent the first magazine in the path of movement of said articles and having a vertical passageway for guiding the parts individually into the second magazine, a carriage for supporting the second magazine, a track on the base for guiding the carriage below said guide member and the guideway therein, means for indexing the carriage to position successive slots in the second magazine in alignment with the guideway, a plunger slidable on the guide member for moving an article through the guideway into the second magazine, means for reciprocating the plunger, a pusher member slidably mounted on the platform for pushing the row of articles from the first magazine, said pusher member having an aperture therethrough with a conical surface, a rod extending through said aperture, means on said frame for supporting said rod for axial reciprocation, a sleeve slidable on said rod within the aperture and the conical surface in said pusher member and having a plurality of radially disposed apertures therein, a ball in each of the apertures in the sleeve engageable with the rod and the conical surface of the pusher member for effecting a gripping engagement between the rod and the pusher member in response to axial movement of the rod in one direction, resilient means for moving the sleeve in said one direction to maintain the balls in engagement with the conical surface and said rod, means for moving the sleeve in the opposite direction to disengage the balls from the conical surface to permit the movement of the pusher member in the opposite direction, means for reciprocating the rod to effect the step-by-step advancing movement of the pusher member and the row of articles to align the end article with the guideway, and drive means for actuating the indexing means, the plunger-reciprocating means and the rod-reciprocating means in timed relation to each other.

References Cited in the file of this patent

UNITED STATES PATENTS

| | | |
|---|---|---|
| 671,731 | Montambault | Apr. 9, 1901 |
| 859,772 | Hoyt | July 9, 1907 |
| 1,580,247 | Henry | Apr. 13, 1926 |
| 2,110,923 | Taylor | Mar. 15, 1938 |
| 2,559,017 | Hanson | July 3, 1951 |
| 2,658,610 | Winslow | Nov. 10, 1953 |
| 2,718,342 | Anderson | Sept. 20, 1955 |
| 2,783,917 | Andrews et al. | Mar. 5, 1957 |